Figure 1:
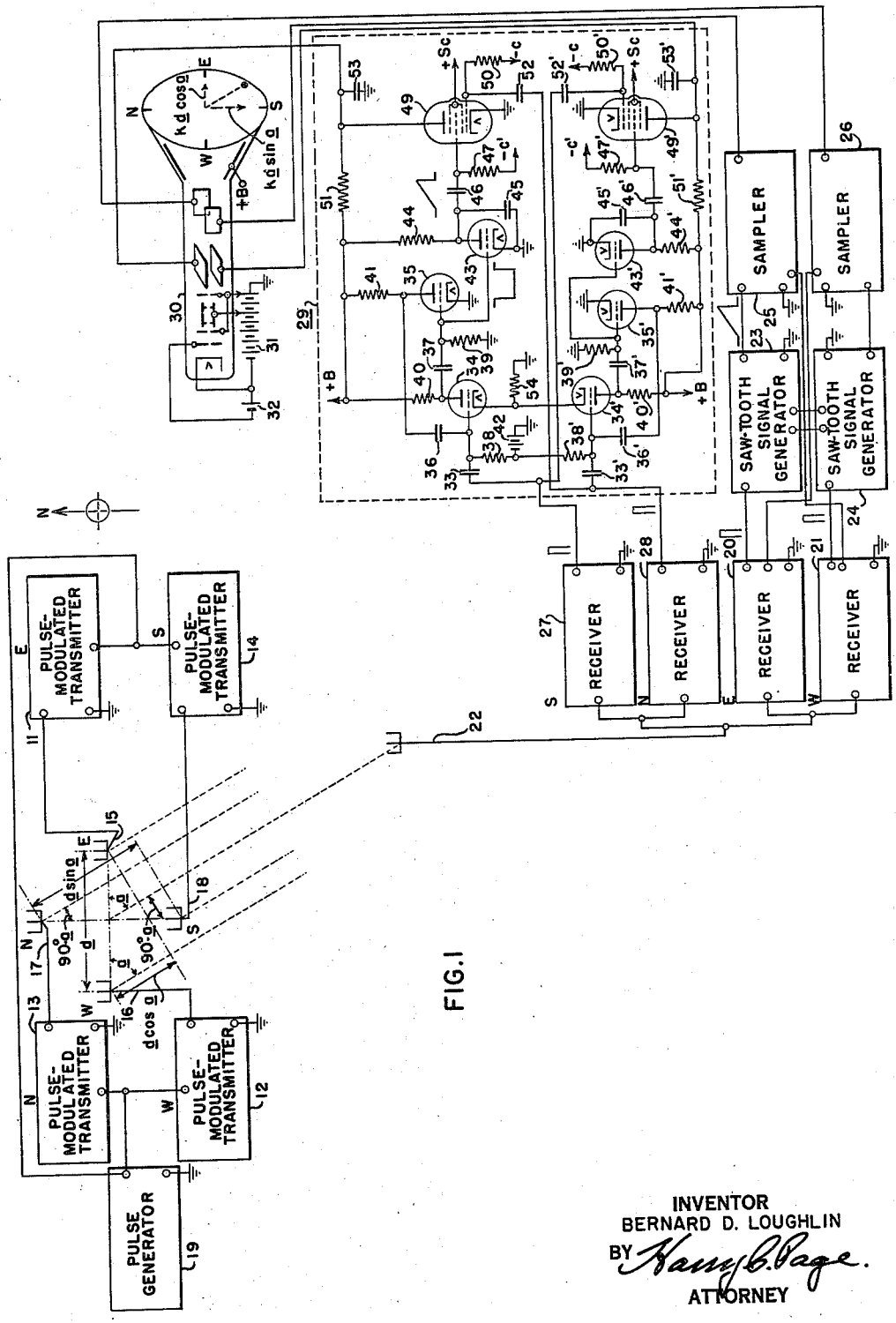

Aug. 27, 1946.   B. D. LOUGHLIN   2,406,468
DIRECTION-INDICATING SYSTEM
Filed Sept. 15, 1944   4 Sheets-Sheet 1

INVENTOR
BERNARD D. LOUGHLIN
BY *Harry C. Page*
ATTORNEY

Aug. 27, 1946.    B. D. LOUGHLIN    2,406,468
DIRECTION-INDICATING SYSTEM
Filed Sept. 15, 1944    4 Sheets-Sheet 2
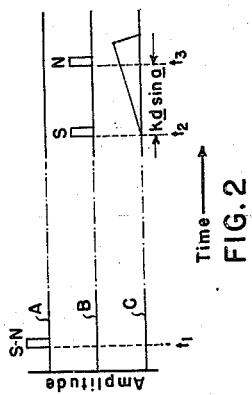
FIG. 2
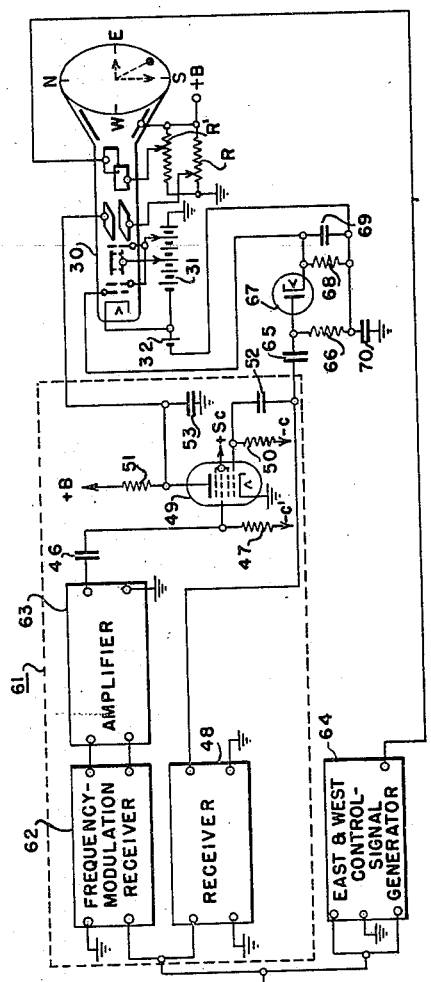
FIG. 3
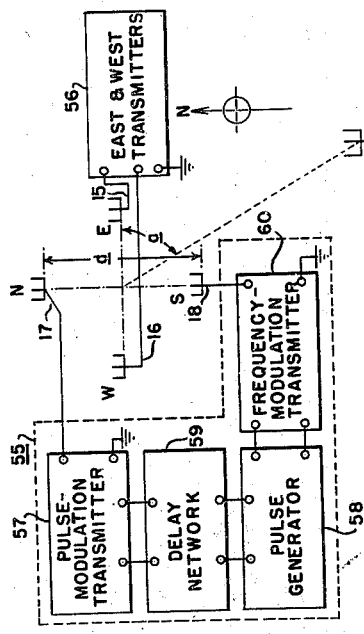
INVENTOR
BERNARD D. LOUGHLIN
BY *Harry C. Page*
ATTORNEY

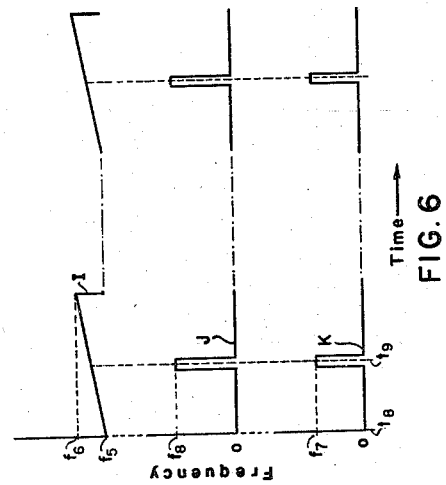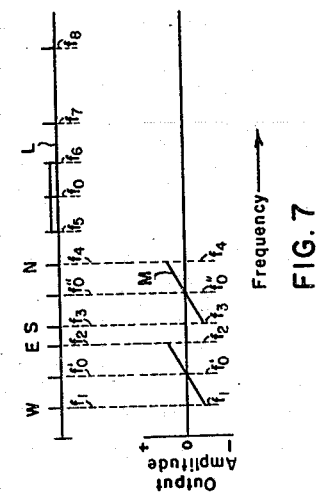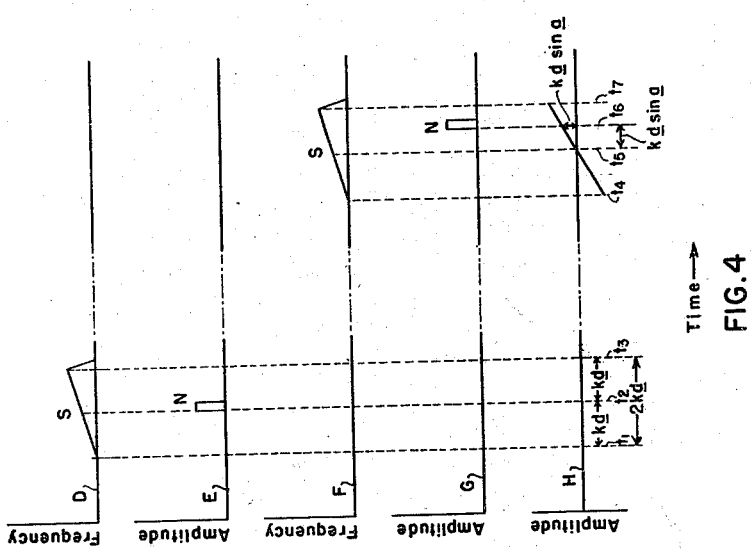

Aug. 27, 1946.   B. D. LOUGHLIN   2,406,468
DIRECTION-INDICATING SYSTEM
Filed Sept. 15, 1944    4 Sheets-Sheet 4

INVENTOR
BERNARD D. LOUGHLIN
BY Harry B. Page
ATTORNEY

Patented Aug. 27, 1946

2,406,468

UNITED STATES PATENT OFFICE 2,406,468

DIRECTION-INDICATING SYSTEM

Bernard D. Loughlin, Bayside, N. Y., assignor, by mesne assignments, to Hazeltine Research, Inc., Chicago, Ill., a corporation of Illinois Application September 15, 1944, Serial No. 554,231

26 Claims. (Cl. 250—11)

The present invention relates to direction-indicating systems of the type adapted for use as an aid in the navigation of a mobile craft and, particularly, to such systems of the radiant-signal type which utilize spaced antennas.

The majority of the prior art systems for aircraft navigation are of the complementary-signal class or the equisignal-locus class used with predetermined defined courses. These systems may be considered direction-indicating systems in the limited sense that the defined courses have predetermined fixed directional relations to a terrestrially located radiating system.

A more general form of direction-indicating system used largely for marine navigation is the radio direction-indicating system which employs a movable directive antenna, usually of the loop or Adcock type, by which to ascertain the direction of a transmitting station from the craft. Two such stations widely spaced furnish sufficient information with the aid of a compass for an ascertainment of position without ambiguity, by calculation or by some plotting process. Where compass bearings are not available or cannot be relied upon, at least three widely spaced stations are necessary for the ascertainment of position. This last-mentioned system has the disadvantage that it not only requires at least two and possibly three widely spaced transmitting systems, but also that it is in general not adapted rapidly and easily to provide desired direction indications.

Other prior art systems have numerous disadvantages and limitations by virtue primarily of the fact that they depend upon the intensity of received wave-signal energy to provide direction indications. Thus, any factor affecting wave-signal intensity, such as unevenness of the terrain surrounding the transmitting antennas or atmospheric fading, seriously impairs the accuracy of such systems. Accuracy of indication may likewise be impaired by changes of the relative intensities or phases of the wave signals applied to the transmitting antenna systems or by relative changes of the amplitudes or phases of modulating signals.

It would be desirable that direction indications through 360 degrees, and without ambiguity, be provided by the use of only one station of fixed location. It would further be desirable that the system be one of the pulse-modulation type which has the important advantages that it permits the transmitting equipment of the system to operate with high peak-power outputs greatly exceeding its average power-output capabilities, thus operating with high power gain, and additionally permits a transpondor type of operation. In the latter mode of operation, the process by which direction is determined is initiated by an interrogating signal which is transmitted from the direction-indicating station to the station which radiates the wave signals used in providing the direction indication. The interrogating signals when received by the latter station initiate and control its operation so that direction-indicating wave signals are radiated only when required, thus minimizing possible interference on adjacent transmitting channels used for other purposes and increasing the element of secrecy which is of importance in military applications.

It is an object of the present invention to provide an improved direction-indicating device and system which is free from one or more of the above-mentioned disadvantages and limitations of prior art systems.

It is also an object of the invention to provide an improved direction-indicating device and system which does not require the use of directional antennas.

It is a further object of the present invention to provide an improved direction-indicating device and system which affords omnidirectional indications of direction without ambiguity.

It is also an object of the present invention to provide a direction-indicating device and system which has one or more of the desirable characteristics mentioned above.

In accordance with the invention there is provided, in a radiant-energy system of the type which effects the translation of diretcion-indicative modulation signals at least one of which is of pulse wave form over at least two space paths extending between an antenna of one antenna system and individual spaced antennas of another antenna system, a direction-indicating device for indicating with relation to a predetermined reference plane the direction of one of the antenna systems relative to the other. This device comprises means for receiving the modulation signal of pulse wave form translated over one of the space paths and means responsive to the modulation signal translated over the other of the space paths for providing a reference signal of saw-tooth wave form having a characteristic which varies with time. The device includes means responsive to the aforesaid received modulation signal of pulse wave form for evaluating the reference signal to derive therefrom a control signal having a characteristic varying with the relative lengths of the aforesaid space paths, and means responsive to the control signal for indicating the aforesaid direction.

For a better understanding of the present invention, together with other and further objects thereof, reference is had to the following description taken in connection with the accompanying drawings, and its scope will be pointed out in the appended claims.

Figure 5:
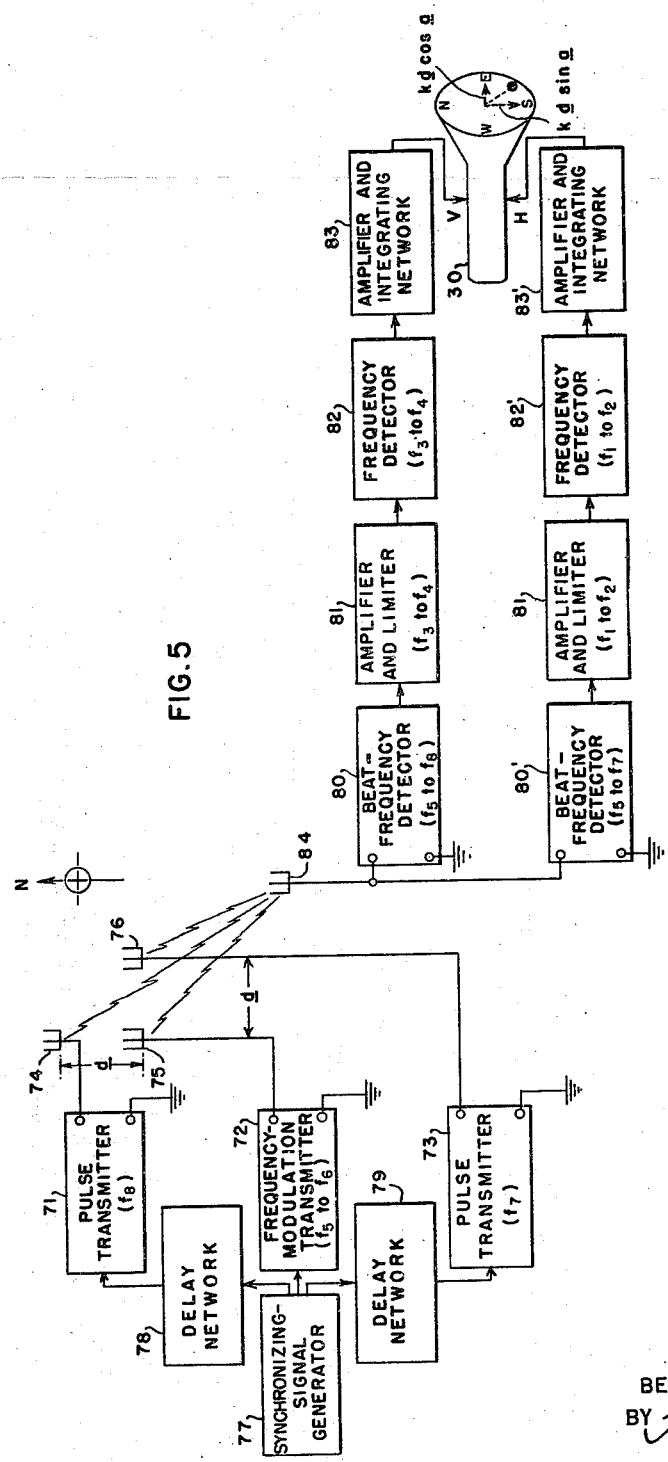

Referring now to the drawings, Fig. 1 is a circuit diagram, partly schematic, of a complete direction-indicating system embodying the present invention; Figs. 3 and 5 are circuit diagrams, partly schematic, of complete direction-indicating systems embodying different modified forms of the invention; while Figs. 2, 4, 6 and 7 comprise curves used as an aid in explaining the operation of the several embodiments of Figs. 1, 3 and 5.

Referring now more particularly to Fig. 1 of the drawings, there is represented a complete direction-indicating system embodying the present invention in a particular form suitable for providing an indication of direction with relation to a predetermined reference plane of longitude which is coincident with a fixed terrestrially positioned antenna system of the indicating system. This arrangement thus provides azimuthal indications. It will be understood, however, that the invention is not so limited and the reference plane may if desired be a horizontal one in which case the indications then involve the aspect of elevational direction. The direction-indicating system includes a pair of transmitters 11 and 12, for generating and transmitting individual ones of a first pair of distinguishable wave signals modulated by individual modulating signals having a determinable time relation therebetween, and a second pair of transmitters 13 and 14, for similarly generating and transmitting individual ones of a second pair of wave signals modulated by individual modulating signals having a determinable time relation therebetween. Each of transmitters 11, 12, 13 or 14 is provided with a respective antenna system 15, 16, 17 or 18, the antennas being positioned in spaced pairs on individual axes of a system of Cartesian coordinates. The antennas are preferably located at the four cardinal points of the compass and equidistant from the origin of the Cartesian coordinate system so that the direction indications provided by the system become azimuthal indications and will be hereinafter referred to as such. Transmitters 11, 12, 13 and 14 may be of conventional design, and preferably are of the pulse-modulation type having individual carrier-wave frequencies. A pulse generator 19, for generating a signal of periodic-pulse wave form, has an output circuit connected to a modulation input circuit of each of the transmitters. It will be understood that the elements 11–19, inclusive, are normally terrestrially located, and that the portion of the system presently to be described comprises a direction-indicating device which normally is associated with a craft the azimuth of which is to be determined.

The direction-indicating device includes means for receiving wave signals from a first two of the spaced antennas, for example, the east and west antennas 15, 16 for developing a first control signal having a value dependent upon the relative times of reception of the modulation components of the wave signals from these first two antennas. More particularly, this means comprises means for receiving the first of these signals to arrive at the indicating device and responsive to the modulation components thereof for developing a reference signal having a characteristic which varies with time. For this purpose there are provided two receivers 20, 21 adapted to receive signals from transmitters 11 and 12, respectively, and hereinafter referred to as the "east and west receivers." Each receiver is provided with a suitable antenna circuit, as by coupling to a common antenna 22. Receiver 20 may include one or more stages of radio-frequency amplification, a detector for deriving the modulation components of a received wave signal, and one or more stages of amplification for amplifying the signal of periodic-pulse wave form derived by the detector. There is also included at one or more points along the signal translating channel of this receiver at least one stage which functions as a limiter to limit to a substantially constant value the pulse amplitude of the periodic-pulse signal developed in the output circuit of the receiver. The output circuit of receiver 20 is coupled to an input circuit of a saw-tooth signal generator 23. Saw-tooth generator 23 is adapted to generate a reference signal which has a characteristic which varies with time and, preferably, one the amplitude of which varies linearly with time, such as a linear saw-tooth signal. Receiver 21 is essentially similar to receiver 20 and has its output circuit coupled to a similar saw-tooth generator 24. Saw-tooth generators 23, 24 are so interconnected, in a manner presently to be explained in greater detail, as to permit the generation of a reference signal only by that one of the saw-tooth generators associated with the receiver which receives the first signal to arrive from the pair of transmitters 11, 12, the other saw-tooth generator being effectively de-energized upon the initiation of this reference signal by the one generator.

The means for developing the above-mentioned first control signal from the wave signals of the east and west antennas 15 and 16 also comprises means responsive to the other of the signals received from this pair of antennas for evaluating the reference signal to derive therefrom a control signal having a value dependent upon the relative times of reception of the modulation components of these wave signals. This means comprises an evaluating or sampling circuit 25, the detailed arrangement of which will be considered hereinafter, having a first input circuit coupled to an output circuit of saw-tooth generator 23 and a second input circuit coupled to an output circuit of receiver 21. To provide bidirectional azimuth indications, the last-mentioned means also includes an evaluating or sampling circuit 26, which is similar in structure, function and arrangement to sampling circuit 25, having a first input circuit coupled to the output circuit of the saw-tooth generator 24 and a second input circuit coupled to an output circuit of the receiver 20.

The direction-indicating device additionally includes means for receiving wave signals radiated from a second two of the antennas, for example the north and south antennas 17, 18, in a different line than the first two antennas for developing a second control signal having a value dependent upon the relative times of reception of the modulation components of the wave signals from the second two antennas. This means comprises two receivers 27, 28 adapted to receive individual wave signals from transmitters 14, 13, respectively, and two saw-tooth signal generators with two sampling circuits indicated generally as a unit 29, arranged in the same manner as the east-west system already described. Receivers 27 and 28 differ from each other and from receivers 20 and 21 in operating frequency but are otherwise similar in structure and function to the latter. The unit 29 is shown in detail as representative of the circuit arrangement of the generators 23, 24, the samplers 25 and 26, and their connections to their associated receivers.

Neglecting for the moment a consideration of the detailed description of those elements of the north-south system which are indicated as the unit 29 and considering further the direction-indicating device as a whole, the direction-indicating device includes signal-display means comprising preferably a cathode-ray tube 30 and appropriate operating potential sources 31 and 32 therefor.

The cathode-ray tube 30 includes means responsive to the above-mentioned first control signal for determining the indications of the display means in one coordinate direction. For this purpose there is provided a pair of deflecting electrodes in cathode-ray tube 30, for example its horizontal beam-deflecting plates, connected in balanced relationship to the output circuits of sampling circuits 25, 26. Similarly the tube 30 includes means responsive to the above-mentioned second control signal for determining the indications of the display means in another coordinate direction. This means comprises a second pair of beam-deflecting electrodes in cathode-ray tube 30, for example its vertical deflecting plates, connected in balanced relationship to the output circuits of the sampling circuits included within the unit 29.

It will be understood that the use of the terms "first control signal" and "second control signal" is intended for the purpose of distinguishing the control signals and is not intended necessarily to indicate time sequence.

Considering now the detailed description of the two saw-tooth generators and samplers of unit 29, the output circuit of the receiver 27 is coupled through a condenser 33 to a control electrode of a tube 34, preferably a triode, comprising the first tube of a conventional univibrator. The univibrator comprises two similar tubes 34 and 35, each of which has its output circuit coupled through one of the condensers 36 or 37 to the input circuit of the other. Each of the tubes 34, 35 is provided with its respective grid-leak resistor 38, 39 and its respective load resistor 40, 41 and both are provided with a common source of space current, indicated as +B. The tube 34 is biased from a source 42 to a normally nonconductive operating condition. The second tube 35 is so biased as to be normally conductive.

The signal output of the univibrator just described is used to develop a saw-tooth reference signal of the type mentioned above. For this purpose, the control electrode of tube 35 is coupled to the control electrode of a triode 43 included in a saw-tooth generator. Tube 43 is provided with anode potential by connection to source +B through resistor 44 and has its output circuit connected across a condenser 45.

The saw-tooth signal just mentioned is coupled to an input circuit of a sampling circuit. Specifically, the anode of tube 43 is coupled through a condenser 46 and grid-leak resistor 47 to a control electrode of a tube 49. This electrode is normally biased negatively from a source indicated as −C′. Another control electrode of tube 49 is negatively biased by a source −C through resistor 50. The screen grid of tube 49 is supplied with an appropriate operating potential from a source indicated as +Sc. The anode of tube 49 is connected through a resistor 51 to the source of potential +B. The last-mentioned control electrode of tube 49 is coupled through a condenser 52 to an output circuit of receiver 28. The anode of tube 49 is by-passed to ground by a condenser 53 and is coupled to one of the vertical deflecting plates of cathode-ray tube 30.

All elements in cascade with receiver 28 have the same reference numerals primed as those employed in describing the corresponding elements in cascade with receiver 27, and essentially are the same in structure, function and circuit arrangement. The anode of tube 49′ is connected to the other vertical deflecting plate of cathode-ray tube 30 and the first control electrode of tube 49′ is coupled to an output circuit of receiver 27. Tubes 34 and 34′ are provided with a common cathode resistor 54, for a purpose to be described hereinafter. A common source of bias potential 42 is provided for the control electrodes of tubes 34 and 34′.

Reference is made to Fig. 2 for an explanation of the operation of the Fig. 1 arrangement. At time $t_1$, which may be considered as the start of an illustrative cycle of operation of the direction-indicating system, transmitters 11, 12, 13 and 14 are modulated by a pulse generated by the generator 19 simultaneously to radiate pulse signals distinguishable in frequency. Assume that the receiving equipment is in the southeast quadrant and consider for the moment only the signals from transmitters 14 and 13, hereinafter referred to as "south" and "north" signals, represented by curve A of Fig. 2. These signals are intercepted by antenna 22 and applied to receivers 27 and 28 where they are selectively received. It is assumed that the distance from the antennas to the indicating device is so great that the convergence of the paths of signal travel from antennas 17 and 18 to antenna 22 may be neglected. Under the assumed conditions, the signals received from the north and south transmitters 13 and 14 by the north and south receivers 28 and 27 are spaced in time at the time of reception by the determinable time relationship $$t = kd \sin a \qquad (1)$$

where $d$ is the distance between antennas 17 and 18,
$a$ is the angle formed by a line drawn from antenna 22 to the mid-point of the line between antennas 15 and 16, and
$k$ is a constant related to the wave-signal velocity and the units of measurement selected.

Similarly, the signals received from transmitters 11 and 12 by the east and west receivers 20 and 21 are spaced in time at the time of reception by the determinable time relation $$t' = kd \cos a \qquad (2)$$

The system has such operation that the control signals which are applied to the cathode-ray tube 30 have values varying with the signal time differentials $kd \cos a$ and $kd \sin a$ thus to provide azimuth or direction indications through a 360-degree angle and without ambiguity.

Under the assumed conditions, the wave signal from the south transmitter 14 is the first one to arrive at the direction-indicating device, for example at instant $t_2$ as shown by curve B. This wave signal is selectively received by receiver 27, and the pulse-modulation components thereof are derived and applied with positive polarity to the control electrode of the first univibrator tube 34. Tube 34, which normally is maintained in a nonconductive condition by the bias of the battery 42, thereupon becomes conductive and applies an amplified potential of negative polarity to the control electrode of the second univibrator tube 35 to render it less conductive. This potential is amplified in tube 35 to produce in its anode circuit a potential of positive polarity which is regeneratively fed back through condenser 36 to the input of tube 34 in phase with the pulse-modulation components applied thereto, thereby cumulating the potentials tending to render tube 34 fully conductive and tube 35 non-conductive. This cumulative action proceeds rapidly and tube 35 therefore is sharply cut off and becomes nonconductive at instant $t_2$. Tube 35 is maintained in a nonconductive state for a predetermined period by a negative potential drop developed across resistor 39 by the discharge of condenser 37 through tube 34, condenser 37 having previously been charged from the source +B through the resistors 39 and 40. As soon as tube 35 is rendered nonconductive, condenser 36 begins to charge from the source +B through resistors 38 and 41 thus to develop a positive potential across the grid resistor 38 of tube 34 which tends to maintain the latter tube in its conductive state.

After a predetermined interval, condenser 37 will have sufficiently discharged that the potential developed across the resistor 39 and applied to the control electrode of tube 35 is insufficient to maintain this tube biased below anode-current cutoff. Tube 35 thereupon becomes conductive and produces in its output circuit a potential of negative polarity which is applied through condenser 36 to the control electrode of tube 34. This potential is amplified in tube 34 and regeneratively fed back in positive polarity through condenser 37 to the control electrode of tube 35, thereby cumulating the potentials tending to render tube 35 fully conductive and tube 34 nonconductive. As before, this cumulative action proceeds rapidly and tube 35 is therefore sharply cut on and tube 34 sharply returned to its normally nonconductive condition. Tube 35 thereafter remains conductive, since its control electrode and cathode are at the same potential, until another pulse is applied from the receiver 27 to tube 34 to initiate another cycle of the operation described.

By a proper selection of the circuit constants of the univibrator, there is produced across the grid resistor 39 of tube 35 a negative potential of approximately rectangular-pulse wave form having a duration at least substantially as long as the maximum difference ever encountered between the times of arrival of the signals from transmitters 14 and 13.

The control pulse thus generated at the control electrode of tube 35 is applied to the control electrode of tube 43 to render it nonconductive during the period of the control pulse. Condenser 45, which was previously charged to the potential existing across tube 43 when it was in its conductive state, is now charged from source +B through resistor 44 to a higher potential. The values of the resistor 44 and condenser 45 are so chosen that the potential across the condenser 45 increases substantially linearly with time, whereby there is generated across the condenser a reference signal having a linear sawtooth characteristic, as represented by curve C of Fig. 2. This reference signal is applied to a control electrode of tube 49. The latter does not repeat the reference signal, however, since it is maintained at anode-current cutoff by the bias $-C$ applied to another of its control electrodes. The time constant of the circuit comprising resistor 44 and condenser 45 is long compared to the duration of this univibrator pulse and is of such a value that the amplitude of the saw-tooth reference signal permits tube 49 to operate within a linear portion of its characteristic.

Assume now that the wave signal from the north transmitter 13 is received by receiver 28 at time $t_3$, Fig. 2. There is then derived in the output circuit of the latter, and applied with positive polarity both to the univibrator tube 34' and to another control electrode of tube 49, a signal of pulse wave form. This signal is not effective to render the univibrator tube 34' conductive, however, since the potential drop produced across cathode resistor 54 when tube 34 became conductive at time $t_2$ renders the cathode of tube 34' positive and is effective to block or disable the saw-tooth generator, comprising tubes 34', 35' and 43', associated with receiver 28. Thus it will be seen that only the first received signal is utilized to derive a reference signal, as illustrated by curve C of Fig. 2. The pulse signal of receiver 28 is, however, effective to render tube 49 conductive thus to derive in its output a control signal having an amplitude varying with the amplitude which the reference signal represented by curve C, and which is applied to the other control electrode of tube 49, has at this time. The signal thus applied to tube 49 from receiver 28 is limited to a substantially constant amplitude by the limiting stage or stages of receiver 28 and effectively evaluates the saw-tooth reference signal applied to this tube from the tube 43. Since the amplitude of the reference signal increases linearly with time, and since the interval $t_2-t_3$ between the signals received by receivers 27 and 28 is equal to $kd \sin a$, it will be apparent that the result of the evaluation by tube 49 of the reference signal is to derive a control signal having a value proportional to $kd \sin a$. This signal is applied to the vertical deflecting electrodes of the cathode-ray tube 30 and is effective to supply a displacement component to the electron beam thereof proportional to $kd \sin a$, thus to determine the indications of the cathode-ray tube in one coordinate direction.

While the operation described thus far has considered only one pulse of the signals of transmitters 13 and 14, it will be understood that these signals are of the periodic-pulse type so that the control signal developed by tube 49 essentially is formed by a large number of repeated cycles of the operation described. The time constant of the circuit comprising condenser 53 and resistor 51 is so selected as to be long compared to the repetition rate of the signals of transmitters 13 and 14 so that a substantially unidirectional potential is applied to the vertical deflecting electrodes of tube 30.

In like manner, wave signals from the east and west transmitters 11 and 12 are selectively received by receivers 20 and 21. Under the assumed conditions, the signal of the transmitter 11 is received first and causes the generator 23 to generate a saw-tooth signal and to block or effectively deenergize the generator 24. The signal of the transmitter 12 is received later in point of time and is applied to the sampler 25 to develop in the output circuit thereof a second control signal having a value dependent upon and proportional to the relative times of reception of the modulation components of wave signals received from transmitters 11 and 12. This control signal is applied by sampler 25 to the horizontal deflecting electrodes of tube 30 and is effective to produce a component of displacement on the electron beam thereof proportional to $kd \cos a$, thus to determine the indications of the cathode-ray tube in another coordinate direction.

The two control signals simultaneously deflect the beam of tube 30 so that there appears on the fluorescent screen thereof a luminous spot the angular position of which indicates the azimuth of the indicating device with relation to the several antennas 15-18, inclusive. The screen of tube 30 may therefore be calibrated in terms of azimuth.

It will further be apparent that when the direction-indicating device is in the northeast quadrant with relation to the spaced antennas a control signal is applied from the output circuit of tube 49' to the vertical deflecting electrodes of tube 30 and is effective to produce a vertical component of deflection of the electron beam thereof in a direction opposite to that hereinbefore described. Further, when the indicating device is in the southwest quadrant, a control signal is applied by sampler 26 to the horizontal deflecting electrodes of tube 30, thus to produce a horizontal component of deflection opposite to that previously described.

From the above description of the Fig. 1 arrangement, it will be apparent that the direction-indicating system is a radiant-energy system of the type which effects the translation of direction-indicative modulation signals, at least one of which is of pulse wave form, over at least two space paths extending between an antenna 22 of one antenna system and individual spaced antennas 15-18, inclusive, of another antenna system. It will further be evident that the direction-indicating device of the invention indicates the azimuth or direction of one of the antenna systems relative to the other. The receivers 20, 21, 27 and 28 of the direction-indicating device comprise means for receiving the modulation signal of pulse wave form translated over one of the space paths, the saw-tooth generators 23, 24 and the corresponding generators of unit 29 comprise means responsive to the modulation signal translated over the other of the space paths for providing a reference signal of sawtooth wave form having a characteristic which varies with time, and the samplers 25, 26 and corresponding samplers of unit 29 comprise means responsive to the received pulse-modulation signal for evaluating this reference signal to derive therefrom a control signal having a characteristic varying with the relative lengths of the space paths. The cathode-ray tube 30 comprises means responsive to the control signal for indicating the azimuth of one of the antenna systems relative to the other.

A direction-indicating system which permits a somewhat simplified form of direction-indicating device is shown in Fig. 3. This system is essentially similar to the Fig. 1 system and similar elements are designated by similar reference numerals. The Fig. 3 system includes a pair of north-south transmitters, indicated as a unit 55, and a pair of east-west transmitters, indicated as a unit 56. The first unit 55 includes a transmitter 57 having a modulation input circuit coupled through a delay network 59 to an output circuit of a generator 58 which generates a signal of periodic-pulse wave form. This signal of pulse wave form preferably amplitude-modulates the wave signal generated by the transmitter 57 to provide a pulse-modulated wave signal. The unit 55 also includes a transmitter 60 having a signal generator coupled to an output circuit of the pulse generator 58 for synchronized operation therewith and adapted to generate a periodic signal of saw-tooth wave form and of saw-tooth duration at least twice as long as the time of wave-signal travel between the antenna systems 17, 18. This saw-tooth signal is applied to a modulator of transmitter 60 to frequency-modulate the carrier wave generated in the latter. The east-west transmitters of unit 56 comprise elements similar in structure, function and arrangement to those of unit 55, either transmitter of the former being frequency-modulated by the saw-tooth signal. The transmitters of units 55 and 56 are provided with individual antennas 15, 16, 17 and 18, disposed as in the Fig. 1 system.

The Fig. 3 system has a direction-indicating device which includes means for receiving wave signals radiated from a first two of the antennas, for example the north-south antennas 17, 18, for developing a first control signal. This means is indicated as a unit 61 and includes means for receiving the frequency-modulated wave signal for developing a reference signal and means for receiving the amplitude-modulated wave signal and responsive to the modulation components thereof for evaluating the reference signal to derive therefrom a control signal having a characteristic varying with the relative times of reception of the modulation components of the received wave signals. The reference-signal developing means comprises a frequency-modulation receiver 62 which includes a conventional limiting system and a balanced frequency detector for deriving in the output circuit thereof a reference signal having an amplitude varying with the instantaneous frequency of the received frequency-modulated wave signal considered with reference to the mean frequency thereof and having a polarity dependent upon whether the instantaneous frequency of the wave signal is greater or less than its mean frequency. An amplifier 63 has an input circuit coupled to an output circuit of the frequency-modulation receiver 62. The output circuit of amplifier 63 is coupled, through the condenser 46, to a control electrode of sampling tube 49, whereby the reference signal is applied to the latter.

The sampling signal means includes a receiver 48 adapted to receive the amplitude-modulated wave signal from transmitter 57 and to derive therefrom the modulation components comprising the sampling signal of periodic-pulse wave form. This receiver includes a limiting system effective to limit the amplitude of the latter signal to a substantially constant value independently of the intensity, over the normal range thereof to be expected in practice, of the wave signal received by the receiver 48. An output circuit of receiver 48 is coupled to another control element of tube 49, whereby there is derived in the output of the tube a control signal having a value dependent upon the relative times of reception of the modulation components of the wave signals from transmitters 57 and 60. The anode of tube 49 is connected to one of the vertical deflecting electrodes of the cathode-ray tube 30 as in the Fig. 1 system, but the other vertical deflecting electrode in the present arrangement is connected through a centering potentiometer R to an energizing source indicated as +B.

As will be explained in greater detail hereinafter, the unidirectional centering biases applied to the deflecting electrodes of the cathode-ray tube 30 deflect the beam thereof to one side of the center of the screen of tube 30 in the absence of any received wave signals. If such deflected position of the beam were to produce an indication on the screen of tube 30, the indication thus provided would be a false indication of direction. To avoid this undesirable condition of operation, there is provided a diode rectifier device 67 having its anode and cathode elements connected through a load resistor 68 to individual terminals of a resistor 66 which is coupled through condensers 65, 70 to an output circuit of receiver 48. The load resistor 68 has connected in shunt thereto a condenser 69 and this resistor and condenser are serially included in the intensity-control electrode circuit of the cathode-ray tube 30. The diode rectifier 67 is so poled that an electron beam can be developed in tube 30 only while wave signals are received by the receiver 48.

The Fig. 3 system also includes means for receiving signals radiated from a second two antennas, namely the east ward antennas 15, 16, for developing a second control signal having a value dependent upon the relative times of reception of the modulation components of the east-west wave signals. This means is indicated as a unit 64 and comprises the same circuit elements and circuit arrangement as the unit 61. The output circuit of the unit 64 is coupled to one of the horizontal deflecting electrodes of the cathode-ray tube 30, the other horizontal electrode being energized from a potential source indicated at +B through a centering potentiometer R'.

Reference is made to the curves of Fig. 4 for an explanation of the operation of the Fig. 3 embodiment. One cycle of the saw-tooth signal of transmitter 60 is represented by curve D and is shown as being initiated at time $t_1$ by the action of pulse generator 58 and as having a saw-tooth duration at least $2kd$ long. The pulse signal of generator 58 also is applied through a delay network 59, having a time delay equal to $kd$, to the transmitter 57. The pulse of this signal which initiated the saw-tooth cycle of curve D is thus applied to the latter unit at time $t_2$ as represented by curve E. Assume now that the direction-indicating device is in the southeast quadrant with relation to the transmitting antenna system. As indicated by curve F, the saw-tooth modulated wave signal of transmitter 60 arrives at antenna 22 at time $t_4$ and is applied to receiver 62, which derives in its output circuit a reference signal, represented by curve H, having an amplitude varying linearly with the frequency of the received wave signal, and independently of the intensity of the latter, and a polarity dependent upon the deviation of frequency above or below its mean frequency. This reference signal has zero amplitude at instant $t_5$. The reference signal thus derived is applied through amplifier 63 and coupling condenser 46 to a control electrode of the sampler tube 49.

Under the assumed conditions, the pulse-modulated wave signal from transmitter 57 is received by the receiver 48 at some later time, for example at time $t_6$, which is displaced from time $t_5$ by an amount dependent upon the relative spacing $d$ of the antennas 17, 18 and the direction of the direction-indicating device with relation to these antennas. The time interval $t_5$—$t_6$ thus is proportional to $kd \sin a$. The modulation components of this received wave signal are derived to provide in the output circuit of receiver 48 a sampling signal of substantially constant amplitude established by the limiting system of the receiver 48 and thus an amplitude independent of the intensity of the received wave signal. This signal is applied through condenser 52 to another control electrode of sampler tube 49, whereby the sampling process occurs as described in connection with the Fig. 1 embodiment. The control signal produced in the output of tube 49 and applied to the vertical deflecting electrodes of the signal-display means thus has a value varying with $kd \sin a$.

Similarly, wave signals from the east and west transmitters of unit 56 are utilized in the east and west receivers of unit 64 to develop a control signal having a value which varies with $kd \cos a$. This signal is applied to the horizontal deflecting electrodes of cathode-ray tube 30. The two control signals thus applied to the deflecting electrodes of tube 30 provide the desired direction indication, as in the Fig. 1 arrangements.

The potentiometer R is so adjusted that the cathode-ray beam of tube 30 is vertically centered on the screen of the latter at a time when the signal of saw-tooth wave form applied to tube 49 has zero amplitude during each pulse applied to this tube from the output circuit of receiver 48; that is, when the direction-indicating device is due east or west of the antennas 17, 18. The potentiometer R' is similarly adjusted horizontally to center the cathode-ray beam of tube 30 when the direction-indicating device is due north or south of the antennas 15, 16.

The unidirectional centering potentials applied to the deflecting electrodes of the cathode-ray tube 30, due to the adjustments of the potentiometers R and R' last mentioned, cause the cathode-ray beam of tube 30 to have a normal deflection to one side of the center of the screen of tube 30 during intervals when no wave signals are received. The intensity-control electrode of tube 30 consequently is biased by the biasing source 32 to space current cutoff so that no electrons impact the screen of this tube in the absence of received wave signals. Upon the receipt of wave signals, however, the signal of periodic-pulse wave form which is developed in the output circuit of the receiver 48 is applied to the diode rectifier device 67. The latter derives across its load resistor 68 from this applied signal a unidirectional control potential which is applied with positive polarity to the intensity-control electrode of cathode-ray tube 30 to bias this electrode sufficiently positive that electrons are permitted to flow from the cathode of tube 30 to its fluorescent screen. The values of the resistor 68 and condenser 69 are so selected that their time constant is sufficiently long effectively to provide peak rectification of the periodic-pulse signal applied to the diode 67. It will thus be apparent that indications are provided by the cathode-ray tube 30 only during intervals when wave signals are received, thus to avoid any false direction indications which otherwise would be produced in the absence of the control circuit comprising the diode rectifier 67 and its associated circuit components.

A direction-indicating system which embodies a modified form of direction-indicating device of the present invention is shown in Fig. 5. This system is essentially similar to the Fig. 3 system and similar elements are designated by similar reference numerals. The Fig. 5 system includes three spaced antennas 74, 75 and 76. The antennas 74 and 75 constitute the north-south antennas while the antennas 76 and 75 are positioned on a line normal to that of the antennas 74, 75 and constitute the east-west antennas. The system includes two transmitters 71, 73 each having a modulation input circuit coupled through a respective delay network 78, 79 to an output circuit of a synchronizing-signal generator 77, which preferably generates a signal of periodic-pulse wave form. The latter signal amplitude-modulates the wave signals generated by transmitters 71, 73. Each of the transmitters 71, 73 has an output circuit coupled to a respective one of the antennas 74, 76. The system also includes a transmitter 72 having a modulation-signal generator coupled to an output circuit of the synchronizing-signal generator 77 for synchronized operation therewith and adapted to generate a periodic signal of saw-tooth wave form. The duration of each saw-tooth cycle of this signal is at least twice as long as the time of wave-signal travel between either of the pairs of antennas 75, 74 or 75, 76. The saw-tooth signal is applied to a modulator included in transmitter 72 to frequency-modulate the carrier wave generated in the latter. Frequency-modulation transmitter 72 has an output circuit coupled to antenna 75. It will be understood that those portions of the Fig. 5 system heretofore described are normally terrestrially located and that the remaining portion of the system presently to be described is normally associated with the craft whose direction is to be determined.

The Fig. 5 system includes a direction-indicating device which includes means for receiving wave signals from a first two of the antennas, for example, the north-south antennas 74, 75, for providing a first control signal. This means includes means for receiving one of the wave signals to provide a reference signal having a characteristic which varies with time and means for mixing therewith the other received wave signal to derive a beat-frequency signal. For this purpose there is provided a beat-frequency detector 80 which has an input circuit coupled to the antenna 84 and tuned to receive the wave signals of both of the transmitters 71 and 72 but to reject the wave signal of the transmitter 73 as by the provision in the input circuit of unit 80 of a wave trap or wave-rejection filter circuit. The detector 80 has an output circuit coupled through a beat-frequency amplifier and limiter 81 to an input circuit of a frequency detector 82. The detector 82 is responsive to the beat-frequency signal for deriving therefrom a control signal having an amplitude varying with the frequency thereof. Detector 82 has an output circuit coupled through an amplifier and integrating network 83 to the vertical beam-deflecting electrodes of cathode-ray tube 30.

The direction-indicating device also includes means for receiving wave signals radiated from a second two of the spaced antennas, for example the east-west antennas 76, 75, and responsive thereto for providing a second control signal. This means comprises a beat-frequency detector 80' having an input circuit coupled to the antenna 84 and tuned to receive the wave signals of both of the transmitters 72 and 73. Coupled to the output circuit of the detector 80', in the order named, are an amplifier and limiter 81', a frequency detector 82' and an amplifier and integrating network 83' generally similar in structure, arrangement and function to the corresponding elements 81–83, inclusive, hereinbefore described. The output circuit of the integrating network 83' is coupled to the horizontal beam-deflecting electrodes of tube 30.

Reference is made to the curves of Figs. 6 and 7 for an explanation of the operation of the system just described. The frequency characteristic of the wave signal of transmitter 72 for several cycles of the saw-tooth modulation signal thereof is represented by curve I, Fig. 6. In response to a pulse generated by generator 77, a cycle of the saw-tooth modulation signal is generated in transmitter 72 and frequency-modulates the wave signal thereof over a frequency range $f_5$–$f_6$. The saw-tooth modulating signal has a saw-tooth duration equal to at least twice the time of wave-signal travel between the antennas 74, 75. The pulse generated by generator 77 is translated through delay network 78 and amplitude-modulates the wave signal of transmitter 71, which has a frequency $f_8$, as represented by curve J. The value of delay provided by the network 78 is preferably so chosen that the pulse modulation occurs at an instant $t_9$ which is later than the initiation at time $t_8$ of a cycle of the signal of saw-tooth wave form, the time delay $t_8$—$t_9$ being equal to the time of signal travel between antennas 74, 75. The signal of pulse wave form generated by the generator 77 is applied in similar manner through the delay network 79, having the same value of delay as the network 78, to a modulation circuit of the transmitter 73 where the wave signal of frequency $f_7$ generated by transmitter 73 is amplitude-modulated by the pulse signal, as indicated by curve K.

The wave signals of transmitters 71, 72, 73 are radiated from antennas 74, 75 and 76, respectively, and are propagated through space to the antenna 84 where they are received and applied to beat-frequency detectors 80 and 80'.

Consider for the moment only the operation of the detector 80 and the circuit elements in cascade therewith. The tuned input circuit of this detector has a pass band sufficiently broad to include the frequency $f_8$ and the frequency range $f_5$–$f_6$, inclusive, but includes a wave-signal trap or filter circuit which enables the detector to reject or be unresponsive to the frequency $f_7$ of the transmitter 73. The wave signal received from transmitter 72 provides in detector 80 a reference signal the frequency of which varies over the frequency range $f_5$–$f_6$ as indicated by graph L of Fig. 7. There is also received by the detector 80 a pulse-modulated wave signal radiated from antenna 74 and having a frequency $f_8$. Assume now that the direction-indicating device is located at some point equidistant from antennas 74 and 75. Under this assumed condition of operation, the phase relationships of the modulation components of the pulse-modulated wave signal from antenna 74 with respect to the modulation components of the frequency-modulated wave signal radiated from antenna 75 are the same upon reception at the direction-indicating device as at the time of radiation since the times of signal travel of the two wave signals are equal. The reference signal and the pulse-modulated signal are combined in detector 80 to derive a beat-frequency signal of periodic-pulse wave form having a difference frequency $f_0''$, Fig. 7. This beat-frequency signal has its amplitude limited by the limiter of unit 81 to reduce the undesirable effect of changes of intensity of the received wave signals due to atmospheric fading and the like. The limited beat-frequency signal is then amplified by the amplifier of unit 81 and applied to frequency detector 82, which has a band-pass characteristic, of width $f_3$–$f_4$, centered on the frequency $f_0''$ and which develops in the output circuit thereof a control signal having a characteristic, for example an amplitude, varying with the deviation of the frequency of the beat-frequency signal from the mean frequency $f_0''$. Frequency detector 82 produces no output signal for the mean frequency $f_0''$, of course, since it is centered on this frequency. For the condition of operation heretofore assumed, no potential is translated through amplifier and integrating network 83 to the vertical deflecting electrodes of tube 43 so that the luminous spot thereof is not deflected in the vertical direction.

Assume now that the position of the direction-indicating device is moved into the northeast quadrant. For this assumed condition of operation, the antenna 74 is then closer to the indicating device than is the antenna 75 and the time of signal travel of the wave signals from antenna 75 is longer than that from antenna 74. The spacing between the antennas 74 and 75 now becomes effective to phase-delay the modulation components of the frequency-modulation wave signal radiated from antenna 75 with respect to the modulation components of the pulse-modulated wave signal radiated from antenna 74. For the condition that the indicating device is due north of the antennas 74, 75, this phase delay is equal to $kd$ which is the maximum phase displacement occasioned by the antenna spacing. Under this last-assumed condition, the reference signal and the pulse-modulation signal are combined in detector 80 to derive a beat-frequency signal having a periodic-pulse wave form and a difference frequency of $f_8$—$f_5$, or $f_4$. Frequency detector 82 has a linear-response characteristic as shown by curve M and provides a signal of positive polarity for any input signal within the frequency range between $f_0''$ and $f_4$. The beat-frequency signal of frequency $f_4$ produces in the output of frequency detector 82 a control signal of maximum amplitude and positive polarity which is characteristic of the north position. This signal is applied through the unit 83 to the vertical deflecting electrodes of tube 30 to produce a maximum upward deflection of the beam thereof in the vertical direction.

Assume on the other hand that the position of the direction-indicating device is moved into the southeast quadrant. In this case, the antenna spacing $d$ is effective to phase-delay the modulation components of the pulse-modulated wave signal from antenna 74 with respect to the modulation components of the frequency-modulated wave signal from antenna 75. The reference signal and pulse-modulated signal are combined in detector 80 to derive a beat-frequency signal which, for the condition that the indicating device is due south of the antenna 74, 75, has a difference frequency of $f_8$–$f_6$ or $f_3$. Frequency detector 82 produces in the output circuit thereof a control signal of negative polarity for any input signal within the range $f_3$–$f_0''$. Thus under the last-assumed condition of operation, frequency detector 82 applies through unit 83 a signal which is characteristic of the south position and is effective to produce a downward deflection of the beam of tube 30 in the vertical direction.

At all assumed positions in the northerly quadrants, the beat-frequency signal derived by the detector 80 has a frequency between $f_0''$ and $f_4$, depending upon the direction of the indicating device with respect to the spaced antennas 74, 75. Similarly, at all points in the southerly quadrants the beat-frequency signal has a frequency between $f_3$ and $f_0''$ dependent upon the same factor. The control signal derived from this beat-frequency signal thus has a polarity and amplitude indicative of direction with relation to the antennas 74, 75.

The operation of the units 80'–83', inclusive, is similar to that described in connection with the units 80–83, inclusive. The pass band of the tuned input circuit of the detector 80' includes the frequency $f_7$ and the frequency range $f_5$–$f_6$, inclusive. The reference signal radiated from antenna 75, and having a frequency range $f_5$–$f_6$, is evaluated by the wave signal of frequency $f_7$ from antenna 76 to develop in the output circuit of the detector 80' a beat-frequency signal having a frequency within the range from $f_1$ to $f_2$. It will be evident that frequency $f_1$ is characteristic of an assumed west position of the direction indicating device and that $f_2$ is characteristic of an assumed east position. The particular frequency of this signal depends, of course, upon the direction of the indicating device with respect to the antennas 75, 76. Discriminator 82' has a linear-response characteristic over the frequency range $f_1$–$f_2$ and is so tuned as to produce a control signal having zero amplitude in response to a beat-frequency signal having a frequency $f_0'$ characteristic of an assumed position of the direction-indicating device due north or south of the antennas 75, 76 and thus equidistant therefrom. The control signal under consideration has a negative polarity and a maximum amplitude for an assumed west position of the indicating device and has a positive polarity and maximum amplitude for an assumed east position. The control signal from the output of frequency detector 82' is applied through amplifier and integrating network 83' to the horizontal beam-deflecting electrodes of tube 30 to determine the indications thereof in another coordinate direction. The resultant deflection of the cathode-ray beam of tube 30 under control of the control signals developed by units 80–83, inclusive and 80'–83', inclusive, thus provides without ambiguity in indication of the direction of the indicating device with relation to the antenna system 74, 75 and 76 as in the Fig. 3 embodiment.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a radiant-energy system of the type which effects the translation of direction-indicative modulation signals at least one of which is of pulse wave form over at least two space paths extending between an antenna of one antenna system and individual spaced antennas of another antenna system, a direction-indicating device for indicating with relation to a predetermined reference plane the direction of one of said antenna systems relative to the other comprising, means for receiving said modulation signal of pulse wave form translated over one of said space paths, means responsive to the modulation signal translated over the other of said space paths for providing a reference signal of saw-tooth wave form having a characteristic which varies with time, means responsive to said received modulation signal of pulse wave form for evaluating said reference signal to derive therefrom a control signal having a characteristic varying with the relative lengths of said space paths, and means responsive to said control signal for indicating said direction.

2. In a radiant-energy system of the type which effects the translation of direction-indicative modulation signals at least one of which is of pulse wave form over at least two space paths extending between an antenna of one antenna system and individual spaced antennas of another antenna system, a direction-indicating device for indicating with relation to a predetermined reference plane the direction of one of said antenna systems relative to the other comprising, means for receiving said modulation signal of pulse wave form translated over one of said space paths, means responsive to the modulation signal translated over the other of said space paths for providing a reference signal of saw-tooth wave form having a characteristic which varies with time over an interval related to the spacing of said spaced antennas, means responsive to said received modulation signal of pulse wave form for evaluating said reference signal to derive therefrom a control signal having a characteristic varying with the relative lengths of said space paths, and means responsive to said control signal for indicating said direction.

3. In a radiant-energy system of the type which effects the translation of direction-indicative modulation signals at least one of which is of pulse wave form over at least two space paths extending between an antenna of one antenna system and individual spaced antennas of another antenna system, a direction-indicating device for indicating with relation to a predetermined reference plane the direction of one of said antenna systems relative to the other comprising, means for receiving said modulation signal of pulse wave form translated over one of said space paths, means responsive to the modulation signal translated over the other of said space paths for providing a reference signal of saw-tooth wave form having a characteristic which varies linearly with time over an interval related to the spacing of said spaced antennas, means responsive to said received modulation signal of pulse wave form for evaluating said reference signal to derive therefrom a control signal having a characteristic varying with the relative lengths of said space paths, and means responsive to said control signal for indicating said direction.

4. In a radiant-energy system of the type which effects the translation of a pulse-modulation signal over at least two space paths extending between an antenna of one antenna system and individual spaced antennas of another antenna system, a direction-indicating device for indicating with relation to a predetermined reference plane the direction of one of said antenna systems relative to the other comprising, means responsive to the pulse-modulation signal translated over the shorter of said space paths for developing a reference signal having a characteristic which varies with time, means responsive to the pulse-modulation signal translated over the longer of said space paths for evaluating said reference signal to derive therefrom a control signal having a characteristic varying with the relative lengths of said space paths, and means responsive to said control signal for indicating said direction.

5. In a radiant-energy system of the type which effects the translation of a pulse-modulation signal over at least two space paths extending between an antenna of one antenna system and individual spaced antennas of another antenna system, a direction-indicating device for indicating with relation to a predetermined reference plane the direction of one of said antenna systems relative to the other comprising, means responsive to the pulse-modulation signal translated over the shorter of said space paths for developing a reference signal of saw-tooth wave form having an amplitude which varies with time, means responsive to the pulse-modulation signal translated over the longer of said space paths for evaluating said reference signal to derive therefrom a control signal having a characteristic varying with the relative lengths of said space paths, and means responsive to said control signal for indicating said direction.

6. In a radiant-energy system of the type which effects the translation of a pulse-modulation signal over at least two space paths extending between an antenna of one antenna system and individual spaced antennas of another antenna system, a direction-indicating device for indicating with relation to a predetermined reference plane the direction of one of said antenna systems relative to the other comprising, means responsive to the pulse-modulation signal translated over the shorter of said space paths for developing a reference signal of saw-tooth wave form having a saw-tooth duration related to the spacing of said spaced antennas, means responsive to the pulse-modulation signal translated over the longer of said space paths for evaluating said reference signal to derive therefrom a control signal having a characteristic varying with the relative lengths of said space paths, and means responsive to said control signal for indicating said direction.

7. In a radiant-energy system of the type which effects the translation of a pulse-modulation signal over at least two space paths extending between an antenna of one antenna system and individual spaced antennas of another antenna system, a direction-indicating device for indicating with relation to a predetermined reference plane the direction of one of said antenna systems relative to the other comprising, means responsive to the pulse-modulation signal translated over the shorter of said space paths for developing a reference signal having a characteristic which varies with time, means responsive to the pulse-modulation signal translated over the longer of said space paths for evaluating said reference signal to derive therefrom a control signal having a characteristic varying with the relative lengths of said space paths, said last-named means including a vacuum tube having a first control electrode coupled to said reference-signal developing means and a second control electrode to which is applied said last-mentioned pulse-modulation signal, and means responsive to said control signal for indicating said direction.

8. In a radiant-energy system of the type which effects the translation of a pair of distinctive pulse-modulation signals over individual ones of at least two space paths extending between an antenna of one antenna system and individual spaced antennas of another antenna system, a direction-indicating device for indicating with relation to a predetermined reference plane the direction of one of said antenna systems relative to the other comprising, a plurality of reference-signal developing means normally responsive to individual ones of said pulse-modulation signals for developing individual reference signals each having a characteristic which varies with time, means responsive to the development of a reference signal by the one of said reference-signal developing means which is responsive to the modulation signal translated over the shorter of said space paths for de-energizing the other of said reference-signal developing means, means responsive to the pulse-modulation signal translated over the longer of said space paths for evaluating the reference signal developed by the responsive reference-signal developing means to derive therefrom a control signal having a characteristic varying with the relative lengths of said space paths, and means responsive to said control signal for indicating said direction.

9. In a radiant-energy system of the type which effects the translation of a first wave signal frequency-modulated with a signal of saw-tooth wave form and of a second wave signal modulated with a signal of pulse wave form over individual space paths extending between an antenna of one antenna system and individual spaced antennas of another antenna system, a direction-indicating device for indicating with relation to a predetermined reference plane the direction of one of said antenna systems relative to the other comprising, means for receiving said first wave signal to provide a reference signal having a characteristic which varies with time, means for receiving said second wave signal and responsive thereto for evaluating said reference signal to derive therefrom a control signal having a characteristic varying with the frequency of said first wave signal during the pulse interval of said second wave signal, and means responsive to said control signal for indicating said direction.

10. In a radiant-energy system of the type which effects the translation of a first wave signal frequency-modulated with a signal of saw-tooth wave form and of a second wave signal modulated with a signal of pulse wave form over individual space paths extending between an antenna of one antenna system and individual spaced antennas of another antenna system, a direction-indicating device for indicating with relation to a predetermined reference plane the direction of one of said antenna systems relative to the other comprising, means for receiving said first wave signal to provide a reference signal having a characteristic which varies with time, means for receiving said second wave signal and responsive to the modulation components thereof for evaluating said reference signal to derive therefrom a control signal having a characteristic varying with the frequency of said first wave signal during the pulse interval of said second wave signal, and means responsive to said control signal for indicating said direction.

11. In a radiant-energy system of the type which effects the translation of a first wave signal frequency-modulated with a signal of saw-tooth wave form and of a second wave signal modulated with a signal of pulse wave form over individual space paths extending between an antenna of one antenna system and individual spaced antennas of another antenna system, a direction-indicating device for indicating with relation to a predetermined reference plane the direction of one of said antenna systems relative to the other comprising, means for receiving said first wave signal and for deriving therefrom a reference signal of saw-tooth wave form, means for receiving said second wave signal and responsive thereto for evaluating said reference signal to derive therefrom a control signal having a characteristic varying with the frequency of said first wave signal during the pulse interval of said second wave signal, and means responsive to said control signal for indicating said direction.

12. In a radiant-energy system of the type which effects the translation of a first wave signal frequency-modulated with a signal of saw-tooth wave form and of a second wave signal modulated with a signal of pulse wave form over individual space paths extending between an antenna of one antenna system and individual spaced antennas of another antenna system, a direction-indicating device for indicating with relation to a predetermined reference plane the direction of one of said antenna systems relative to the other comprising, means for receiving said first wave signal to provide a reference signal having a characteristic which varies with time and for receiving and hetrodyning therewith said second wave signal to derive therefrom a beat-frequency signal having a frequency varying with the frequency of said first received wave signal during the pulse interval of said second received wave signal, means responsive to said beat-frequency signal for deriving therefrom a control signal having an amplitude varying with the frequency of said beat-frequency signal, and means responsive to said control signal for indicating said direction.

13. In a direction-indicating system of the type including at least one transmitter and a pair of spaced antennas for transmitting individual ones of a pair of wave signals modulated by individual modulation signals having a determinable time relation therebetween and at least one of which has a pulse wave form, a direction-indicating device for receiving said wave signals to indicate with relation to a predetermined reference plane its direction with respect to said antennas comprising, means for receiving the one of said wave signals which is modulated by the modulation signal of pulse wave form, means for receiving the other of said wave signals to provide a reference signal having a characteristic which varies with time, means responsive to said one received signal for evaluating said reference signal to derive therefrom a control signal having a characteristic varying with the relative times of reception of the modulation components of said wave signals, and means responsive to said control signal for indicating said direction.

14. In a direction-indicating system of the type including at least one transmitter and a pair of spaced antennas for transmitting individual ones of a pair of distinguishable wave signals modulated by individual modulation signals having a determinable time relation therebetween and at least one of which has a pulse wave form, a direction-indicating device for receiving said wave signals to indicate with relation to a predetermined reference plane its direction with respect to said antennas comprising, means for selectively receiving the one of said wave signals which is modulated by the modulation signal of pulse wave form, means for selectively receiving the other of said wave signals to provide a reference signal having a characteristic which varies with time, means responsive to said one received signal for evaluating said reference signal to derive therefrom a control signal having a characteristic varying with the relative times of reception of the modulation components of said wave signals, and means responsive to said control signal for indicating said direction.

15. In a radiant-energy system of the type which effects the translation of direction-indicative modulation signals at least one of which is of pulse wave form over at least two pairs of space paths extending between an antenna of one antenna system and individual pairs of spaced antennas of another antenna system, a direction-indicating device for indicating with relation to a predetermined reference plane the direction of one of said antenna systems relative to the other comprising, means for receiving said modulation signal of pulse wave form translated over one space path of each pair thereof, means responsive to the modulation signal translated over the other space path of each pair thereof for providing individual reference signals of saw-tooth wave form each having a characteristic which varies with time, means responsive to the modulation signal received over said one space path of each pair thereof for evaluating said reference signal provided for the other path of said each pair to derive therefrom individual control signals each having a characteristic varying with the relative lengths of the space paths of said each pair of space paths, and signal-display means responsive jointly to said control signals for indicating in two coordinate directions and without ambiguity said direction.

16. In a radiant-energy system of the type which effects the translation of direction-indicative modulation signals at least one of which is of pulse wave form over at least two pairs of space paths extending between an antenna of one antenna system and individual pairs of spaced antennas of another antenna system, a direction-indicating device for indicating with relation to a predetermined reference plane the direction of one of said antenna systems relative to the other comprising, means for receiving said modulation signal of pulse wave form translated over one space path of each pair thereof, means responsive to the modulation signal translated over the other space path of each pair thereof for providing individual reference signals of saw-tooth wave form each having a characteristic which varies with time, means responsive to the modulation signal received over said one space path of each pair thereof for evaluating said reference signal provided for the other path of said each pair to derive therefrom individual control signals each having a characteristic varying with the relative lengths of the space paths of said each pair of space paths, and a cathode-ray tube responsive to one of said control signals for deflecting the cathode-ray beam thereof in one coordinate direction and simultaneously responsive to the other of said control signals for deflecting the cathode-ray beam of said tube in another coordinate direction normal to said first direction, whereby the deflected position of said beam provides without ambiguity an indication of said direction.

17. In a radiant-energy system of the type which effects the translation of pulse-modulation signals over at least two pairs of space paths extending between an antenna of one antenna system and individual pairs of spaced antennas of another antenna system, a direction-indicating device for indicating with relation to a predetermined reference plane the direction of one of said antenna systems relative to the other comprising, means responsive to the pulse-modulation signal translated over the shorter space path of each pair thereof for developing individual reference signals each having a characteristic which varies with time, means responsive to the pulse-modulation signal translated over the longer space path of each pair thereof for evaluating the reference signal developed for the other path of said each pair to derive therefrom individual control signals each having a characteristic varying with the relative lengths of the space paths of said each pair of space paths, and signal-display means responsive jointly to said control signals for indicating in two coordinate directions and without ambiguity said direction.

18. In a direction-indicating system of the type including at least one transmitter and at least three antennas spaced in nonlinear relationship for transmitting individual ones of a plurality of wave signals modulated by individual modulation signals having a determinable time relation therebetween, a direction-indicating device for receiving said wave signals to indicate with relation to a predetermined reference plane its direction with respect to said antennas comprising, means for receiving wave signals radiated from a first two of said antennas to provide a first control signal having a characteristic varying with the relative times of reception of the modulation components of said wave signals, means for receiving wave signals radiated from a second two of said antennas in a different line than said first two antennas to provide a second control signal having a characteristic varying with the relative times of reception of the modulation components of said last-named wave signals, and signal display means responsive to said first control signal for determining the indications thereof in one coordinate direction and simultaneously responsive to said second control signal for determining the indications thereof in another coordinate direction, thereby to provide without ambiguity indications of said direction.

19. In a direction-indicating system of the type including at least one transmitter and at least three antennas spaced in nonlinear relationship for transmitting individual ones of a plurality of wave signals modulated by individual modulation signals having a determinable time relation therebetween, a direction-indicating device for receiving said wave signals to indicate with relation to a predetermined reference plane its direction with respect to said antennas comprising, means for receiving wave signals radiated from a first two of said antennas to provide a first control signal having a characteristic varying with the relative times of reception of the modulation components of said wave signals, means for receiving wave signals radiated from a second two of said antennas in a different line than said first two antennas to provide a second control signal having a characteristic varying with the relative times of reception of the modulation components of said last-named wave signals, and a cathode-ray tube including means responsive to the first control signal for deflecting the electron beam thereof in one coordinate direction and simultaneously responsive to the second control signal for deflecting said electron beam in another coordinate direction, whereby the deflected position of said beam provides without ambiguity an indication of said direction.

20. In a direction-indicating system of the type including at least one transmitter and at least three antennas spaced in nonlinear relationship for transmitting individual ones of a plurality of wave signals modulated by individual modulation signals having a determinable time relation therebetween, a direction-indicating device for receiving said wave signals to indicate with relation to a predetermined reference plane its direction with respect to said antennas comprising, means for receiving one of a first pair of said wave signals radiated from a first pair of said antennas to provide a first reference signal having a characteristic which varies with time, means for receiving the other of said first pair of wave signals and responsive to the modulation components thereof for evaluating said first reference signal to provide a first control signal having a characteristic varying with the relative times of reception of the modulation components of said first pair of wave signals, means for receiving one of a second pair of wave signals radiated from a second pair of said antennas in a different line than said first pair to provide a second reference signal having a characteristic which varies with time, means for receiving the other of said second pair of wave signals and responsive to the modulation components thereof for evaluating said second reference signal to provide a second control signal having a characteristic varying with the relative times of reception of the modulation components of said second pair of wave signals, and signal-display means responsive to said first control signal for providing an indication in one coordinate direction and simultaneously responsive to said second control signal for providing an indication in another coordinate direction, whereby said indication in said coordinate directions provides without ambiguity indications of said direction.

21. A direction-indicating system comprising, a pair of antenna systems remotely spaced from one another and at least one of which includes spaced antennas, means coupled to one of said antenna systems for effecting the translation of direction-indicative modulated wave signals at least one of which is a pulse-modulated wave signal over at least two space paths extending between an antenna of one antenna system and individual spaced antennas of another antenna system, means coupled to the other of said antenna systems for receiving said pulse-modulated wave signal translated over one of said space paths, means coupled to said other antenna system for receiving the wave signal translated over the other of said space paths for providing a reference signal of saw-tooth wave form having a characteristic which varies with time, means responsive to said received pulse-modulated wave signal for evaluating said reference signal to derive therefrom a control signal having a characteristic varying with the relative lengths of said space paths, and means responsive to said control signal for indicating with relation to a predetermined reference plane the direction of one of said antenna systems relative to the other.

22. A direction-indicating system comprising, a pair of antenna systems remotely spaced from one another and at least one of which includes spaced antennas, means coupled to one of said antenna systems for effecting the translation of a pulse-modulated wave signal over at least two space paths extending between an antenna of one antenna system and individual spaced antennas of another antenna system, means coupled to the other of said antenna systems and responsive to the wave signal translated over the shorter of said space paths for developing a reference signal having a characteristic which varies with time, means coupled to said other antenna system and responsive to the modulation signal translated over the longer of said space paths for evaluating said reference signal to derive therefrom a control signal having a characteristic varying with the relative lengths of said space paths, and means responsive to said control signal for indicating with relation to a predetermined reference plane the direction of one of said antenna systems relative to the other.

23. A direction-indicating system comprising, means for providing two wave signals, means for modulating said wave signals with individual modulation signals having a determinable time relation therebetween, at least one of said modulating signals having a pulse wave form, a pair of spaced antennas coupled to said first-mentioned means for radiating individual ones of said modulated wave signals, means for receiving the one of said wave signals which is modulated by said one modulation signal of pulse wave form, means for receiving the other of said wave signals and responsive to the modulation components thereof to provide a reference signal having a characteristic which varies with time, means responsive to the modulation components of said one received signal for evaluating said reference signal to derive therefrom a control signal having a characteristic dependent upon the relative times of reception of the modulation components of said wave signals, and means responsive to said control signal for indicating with relation to a predetermined reference plane the direction of said receiving means relative to said antennas.

24. A direction-indicating system comprising, means for providing two wave signals, means for modulating said wave signals with individual modulating signals having pulse wave forms and a determinable time relation therebetween, a pair of spaced antennas coupled to said first-mentioned means for radiating individual ones of said modulated wave signals, means for receiving the one of said wave signals first to arrive at said indicating device and responsive to the modulation components thereof for developing a reference signal having a characteristic which varies with time, means for receiving the other of said wave signals and responsive to the modulation components thereof for evaluating said reference signal to derive therefrom a control signal having a characteristic varying with the relative times of reception of the modulation components of said wave signals, and means responsive to said control signal for indicating with relation to a predetermined reference plane the direction of said receiving means relative to said antennas.

25. A direction-indicating system comprising, means for providing two wave signals, means for frequency-modulating one of said wave signals with a signal of saw-tooth wave form and for modulating the other of said wave signals with a signal of pulse wave form having a determinable time relation with respect to said saw-tooth signal, a pair of spaced antennas coupled to said first-mentioned means for radiating individual ones of said modulated wave signals, means for receiving the one of said signals which is modulated by said modulation signal of pulse wave form, means for receiving the other of said wave signals and responsive to the modulation components thereof for providing a reference signal having a characteristic which varies with time, means responsive to the modulation components of said one received wave signal for evaluating said reference signal to derive therefrom a control signal having a characteristic varying with the frequency of said other received wave signal during the pulse interval of said one received wave signal, and means responsive to said control signal for indicating with relation to a predetermined reference plane the direction of said receiving means relative to said antennas.

26. A direction-indicating system comprising, means for providing two wave signals, a pair of spaced antennas coupled to said first-mentioned means for radiating individual ones of said wave signals, means for frequency-modulating one of said wave signals with a signal of saw-tooth wave form having a saw-tooth duration at least twice as long as the time of wave-signal travel between said spaced antennas, means for modulating the other of said wave signals with a signal of pulse wave form having each pulse thereof delayed in time from the initiation of a corresponding cycle of said signal of saw-tooth wave form by the time of wave-signal travel between said spaced antennas, means for receiving said frequency-modulated wave signal to provide a reference signal having a characteristic which varies with time, means for receiving said other wave signal and responsive to the modulation components thereof for evaluating said reference signal to derive therefrom a control signal having a characteristic dependent upon the relative times of reception of the modulation components of said wave signals, and means responsive to said control signal for indicating with relation to a predetermined reference plane the direction of said receiving means relative to said antennas.

BERNARD D. LOUGHLIN.